United States Patent [19]

Kriege

[11] 4,110,727

[45] Aug. 29, 1978

[54] METHOD OF MANUFACTURING TRANSDUCER

[75] Inventor: Richard P. Kriege, Skiatook, Okla.

[73] Assignee: Lowrance Electronics, Inc., Tulsa, Okla.

[21] Appl. No.: 709,891

[22] Filed: Jul. 29, 1976

Related U.S. Application Data

[63] Continuation of Ser. No. 573,315, Apr. 30, 1975, abandoned.

[51] Int. Cl.[2] ........ H04B 13/00

[52] U.S. Cl. ........ 340/10; 340/8 R

[58] Field of Search ........ 340/8 R, 9, 10, 11, 340/12, 13, 14; 310/9.1; 29/25.35; 43/17.1

[56] References Cited

U.S. PATENT DOCUMENTS

| | | | |
|---|---|---|---|
| 2,442,785 | 6/1948 | Shapiro et al. | 340/10 X |
| 2,473,971 | 6/1949 | Ross | 340/10 X |
| 2,894,317 | 7/1959 | Marks | 340/10 |
| 2,920,318 | 1/1960 | Balcken et al. | 43/17.1 X |
| 3,113,287 | 12/1963 | Renner | 340/8 |
| 3,212,056 | 10/1965 | Grieg | 340/9 |
| 3,255,431 | 6/1966 | Howatt | 340/10 |
| 3,277,435 | 10/1966 | Thompson et al. | 340/10 |
| 3,382,598 | 5/1968 | Wilson | 340/10 |
| 3,713,086 | 1/1973 | Trott | 340/10 |

*Primary Examiner*—Harold Tudor

*Attorney, Agent, or Firm*—Head, Johnson & Chafin

[57] ABSTRACT

Method and apparatus for making a sonic transducer in which a lead zirconate titanate crystal in the form of a shallow cylinder is prepared and inserted into a shallow plastic thin walled cup with one face of the crystal in intimate contact with, and cemented by means of epoxy plastic to, the inner surface of the base of the cup. The sides and back of the crystal are protected with a thin layer of cork and all other space within the cup is filled with plastic. The cup and crystal is then inserted, open end first, into a cylindrical depression in a crystal holder, or transducer, so that the outer surface of the base of the cup is flush with the face of the transducer. The cup and crystal are cemented into the transducer.

4 Claims, 8 Drawing Figures

METHOD OF MANUFACTURING TRANSDUCER

This is a continuation of application Ser. No. 573,315, filed Apr. 30, 1975, now abandoned.

This invention lies in the field of sonic transducers for use in under water signalling. More specifically, it concerns the manner of construction of the crystal unit and the crystal holder which form the transducer of the signalling system.

In the prior art it has been customary to provide a suitable crystal of suitable piezo electric material, and to plate the two surfaces of the crystal, and to attach suitable leads thereto. The crystal then is inserted into a suitable cavity in a crystal holder, or transducer. The crystal is cemented with epoxy cement, or other suitable cement, to the inner walls of the cavity in the transducer. The exposed face of the crystal is generally covered with a layer of epoxy of the order of 0.1 inch thick. The exposed surface of the epoxy after it has suitably hardened is then machined down to be flush with the face of the transducer.

By this construction it has been very difficult to determine exactly where the face of the crystal is, and what the thickness is of the epoxy covering over the crystal. If the face of the crystal is not directed perpendicular to the axis of the cavity then the direction of the beam of sonic energy will not be in the direction of the axis of the transducer cavity. It is important to know that the face of the crystal is parallel to the face of the transducer, and to know how thick the covering of epoxy cement is, and that the covering is uniform in thickness. This invention is directed to providing an improved means of mounting the crystal into the tranducer, so that the active face of the crystal is precisely known in position.

SUMMARY OF THE INVENTION

It is a primary object of this invention to provide an apparatus and method of construction of a sonic transducer in which the position of the active face of the crystal is precisely known and can be made parallel to the face of the transducer.

This and other objects and advantages of this invention and a better understanding of the principles and details of the invention will be evident from the following description taken in conjunction with the appended drawings in which.

Figure 6:
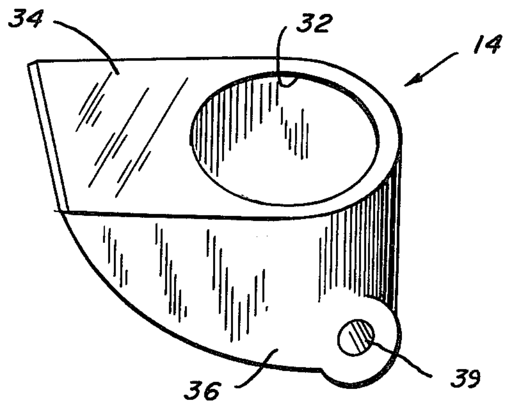

FIG. 6 indicates the construction of the transducer housing.

Figure 7:
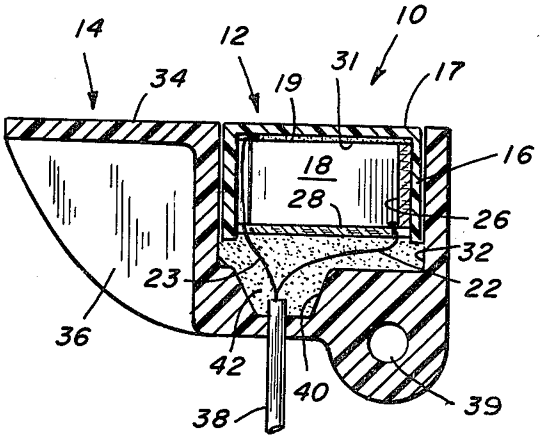
Figure 8:
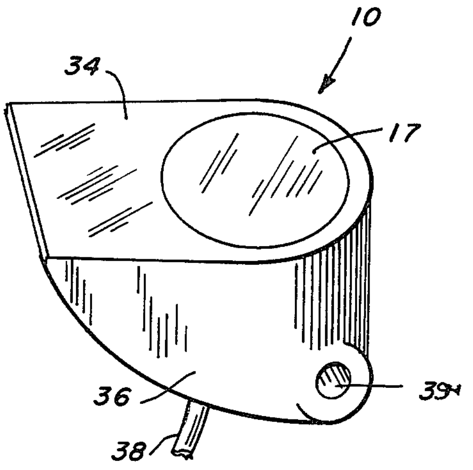

FIGS. 7 and 8 show views of the transducer with the crystal.

DESCRIPTION OF THE PREFERRED EMBODIMENT

Referring now to the drawings, there is shown in FIG. 7, in cross-section, a view of the completed crystal transducer. This is indicated generally by the numeral 10.

The transducer housing, which is the assembly into which the crystal is inserted, is indicated generally by the numeral 14 and is shown in FIG. 6.

Figure 3:
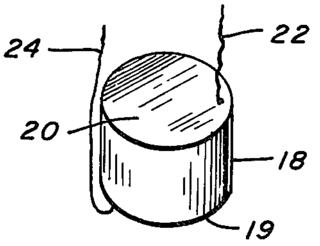
Figure 4:
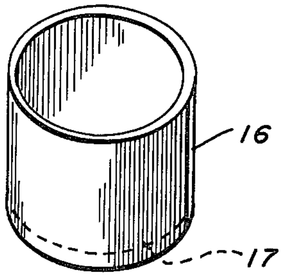

In FIG. 3 is shown a view of the piezo electric crystal 18. This comprises a shallow cylinder of piezo electric material, known as lead zirconate titanate. This is prepared by well-known means, is available on the market, and can be purchased in any desired shape, size, and piezoelectric polarization. The crystals are polarized so that a pressure on one face will provide an electrical signal. Both faces of the crystal are plated with silver by means well-known in the art, and leads such as 22, 24 are soldered one to each of the faces 19, 20 of the crystal 18.

Figure 1:
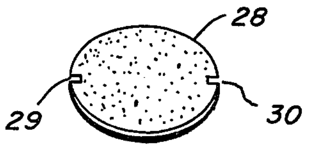
FIGS. 1, 2, 3 and 4 show the component parts of the crystal assembly.
Figure 2:
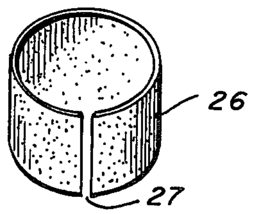

In use it is important to shield the circumferential surface 18, and the back surface 20 of the crystal, from pressure. The front surface is exposed to the pressure of the sound wave in the water, and generates the electrical signal. This shielding is done by wrapping the circumferential surface of the crystal 18 with a thin strip of cork 26, FIG. 2, and covering the back surface 20 with a thin sheet of cork 28, FIG. 1. These can be attached by cement to the surfaces of the crystal.

Also it is important that the active front surface of the crystal be positioned so that it is perpendicular to the axis of the transducer so that the direction of propagation of the elastic waves in the water will be in a known direction. In the past, when the crystals were just inserted into a cylindrical cavity in the transducer and cemented with epoxy cement, very often the crystal would not be aligned coaxial with the cavity, and therefore the front face of the crystal would be directed at an angle to the axis of the transducer. The elastic waves in the water therefore would not propagate in the intended direction.

In this invention a thin walled plastic cup 16, having a top open end, and a closed bottom 17, is provided, which is slightly larger in diameter than the crystal plus its wrapping of cork. A small amount of suitable epoxy cement is placed in the cup and the crystal with its wrapping is inserted with the exposed face of the crystal downward into the cup and against the epoxy cement on the bottom. A suitable pressure is provided on the back surface of the crystal so that excess epoxy and all air between the active face of the crystal and the bottom of the cup is removed. When this is accomplished, the space around the crystal within the annular space between the crystal and the cup is filled with epoxy cement. The cement is then permitted to harden.

Figure 5:
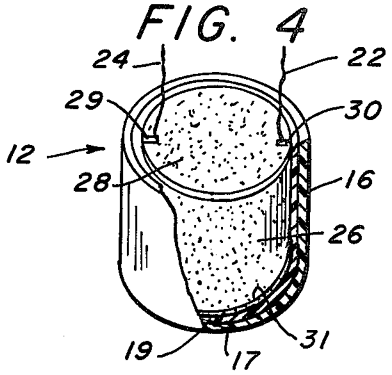
FIG. 5 illustrates, in partial cross-section, the construction of the crystal assembly.

Such an assembly is shown in FIG. 5 where the back surface of the crystal, which is at the open end of the cup, and the cork covering 28 is exposed. The lead 22 from the back surface of the crystal comes up through the slot 30 in the cork 28. The lead 24 from the front surface of the crystal comes up through the slot 27 in the cork wrapping 26 around the crystal and up through the slot 29 in the cork 28. The front face 19 of the crystal is now in contact, through a thin layer 31 of epoxy, with the bottom 17 of the cup.

In general, the thickness of the material between the active surface 19 of the crystal and the water should not be greater than about 0.1 inch and preferably less. It should also be of uniform thickness, as explained previously. The cup 16 is molded of thermo-plastic material of suitable type, well-known in the art, and of a thickness of about 0.1 inch. Therefore, the layer of epoxy 31 should be as thin as possible.

This is shown to best advantage, in cross-section, in FIG. 7. The crystal 18 is shown with the cork wrapping 26 around the side and the cork layer 28 on its back surface. There is a thin layer 31 of epoxy between the crystal and the bottom 17 of the cup. Lead 22 is shown coming from the back surface of the crystal, and lead 23 from the front surface of the crystal in the joint 27 between the ends of the cork wrapping 26. These leads 22 and 23 are joined by well-known means to a suitable shielded cable 38 such as is commonly used in transducers of this type.

The housing of the transducer 14 has a cavity 32 which is slightly larger than the outer diameter of the cup 16. There is a space 40 in the lower part of the cavity for the junction between the leads 22, 23 and the cable 30, the cable passing through the lower wall of the cavity through an appropriate opening. The space in the bottom of the cavity is partially filled with suitable epoxy 42, and after the cable 38 is inserted through the opening, the crystal-cup assembly is pressed into the cavity until the base surface 17 of the cup is flush with the front surface 34 of the transducer. Then the second epoxy is permitted to harden.

The transducer housing is provided with an opening 38 through which a bolt can be passed so that the transducer can be mounted in a bracket and turned to a suitable angle, etc. as is well-known in the art.

The principal feature of this invention lies in the means for providing assurance that the active face of the crystal is parallel to the face of the transducer. This is accomplished by preparing a suitable plastic cup having a thin walled bottom of uniform thickness, and cementing the crystal into the cup so that the active face is in close, intimate contact with the bottom of the cup, with a very thin layer of epoxy cement to hold it in position. Since undesirable signals can be generated if sonic pressure is applied to the side wall of the crystal, this is protected by a thin layer of cork which has entrained air which serves as a barrier against the transmission of elastic waves, and provides a strong reflecting medium so that sonic waves impinging on the side of the transducer will be reflected from the air interface instead of being transmitted through the cork to the crystal. The same action applies to the bottom surface of the crystal.

While the piezoelectric crystal can be made of one of many different materials, the preferred material is lead-zirconate-titanate, which is readily available on the market.

Also, any type of epoxy resin can be used to assemble the transducer. A preferred resin is Hardman's (Manufacture) (Part A) type 8200. The preferred curing agent is Hardman's type 8200 (Part B). These are available on the market.

Mix ratio is 1 part of A to one part of B by volume. These are mixed with a minimum of entrained air. An amount up to about 1/16 inches is placed in the cup on the bottom. The crystal is inserted into the cup, active face down. Sufficient pressure is applied to force the crystal as close to the bottom of the cup as possible. The cup is then filled over the crystal with epoxy. Curing time is 24 hours at 77° F.

While the invention has been described with a certian degree of particularity it is mainfest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

I claim:

1. A sonic transducer, comprising:

(a) a transducer housing having an exposed planar face, a cylindrical cavity in the face of selected diameter A, a small diameter opening opposite the face communicating between the bottom of the cavity and the exterior of the housing and a mounting opening through the housing adjacent the side opposite said planar face and in a plane perpendicular to the axis of said cylindrical cavity;

(b) a thin walled cylindrical thermoplastic cup having a planar base having an outer diameter less than A, and an inner diameter B, and having a base of selected thickness T;

(c) a piezoelectric crystal in the form of a shallow circular cylinder, having leads attached to each face, the back face being covered with a thin sheet or cork, the circumferential surface being covered with a thin sheet of cork, the outer diameter of the crystal plus the cork being less than B;

(d) said crystal with the said cork coverings being cemented into said cup with suitable cement, with a thin layer of said cement between the exposed face of said crystal and the inner surface of the bottom of said cup, the cup, crystal, cork and cement forming an integral subassembly;

(e) said cup subassembly being inserted and cemented into said cavity in said housing, with the base of said cup flush with said front face of said housing, and said leads extending through said small diameter opening; and (f) epoxy material filling all areas of said housing cavity between said cup subassembly and the bottom of said cavity and sealing said small diameter opening having said leads therein.

2. The transducer as in claim 1 in which said crystal is constructed of lead-zirconate-titanate material.

3. The transducer as in claim 2 in which the diameter of said crystal is approximately 1.0 inch and the thickness of said crystal is approximately 0.5 inch.

4. The transducer as in claim 1 in which the thickness T of the base of said cup is approximately 0.1 inch.

* * * * *